United States Patent
Liu et al.

(10) Patent No.: US 10,555,340 B2
(45) Date of Patent: Feb. 4, 2020

(54) METHOD FOR TRANSMISSION AND RECEPTION IN PARALLEL ON DUAL CHANNELS, AND APPARATUS

(71) Applicant: Huawei Technologies Co., Ltd., Shenzhen (CN)

(72) Inventors: Yun Liu, Shenzhen (CN); Sheng Liu, Shenzhen (CN); Teyan Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/829,252

(22) Filed: Dec. 1, 2017

(65) Prior Publication Data

US 2018/0084582 A1 Mar. 22, 2018

Related U.S. Application Data

(63) Continuation of application No. PCT/CN2016/086948, filed on Jun. 23, 2016.

(30) Foreign Application Priority Data

Jun. 26, 2015 (WO) ................ PCT/CN2015/082572

(51) Int. Cl.
| | |
|---|---|
| *H04W 74/08* | (2009.01) |
| *H04W 28/20* | (2009.01) |
| *H04W 84/12* | (2009.01) |

(52) U.S. Cl.
CPC ....... *H04W 74/0808* (2013.01); *H04W 28/20* (2013.01); *H04W 84/12* (2013.01)

(58) Field of Classification Search
CPC . H04W 28/20; H04W 84/12; H04W 74/0808; H04W 74/08; H04L 27/2605;
(Continued)

(56) References Cited

U.S. PATENT DOCUMENTS

| | | | | |
|---|---|---|---|---|
| 8,395,997 B2* | 3/2013 | Banerjea | ............... | H04W 72/04 370/241 |
| 8,743,851 B2* | 6/2014 | Banerjea | ............... | H04W 72/04 370/338 |

(Continued)

FOREIGN PATENT DOCUMENTS

| | | |
|---|---|---|
| CN | 102013959 A | 4/2011 |
| CN | 102448125 A | 5/2012 |

(Continued)

OTHER PUBLICATIONS

Machine Translation and Abstract of Chinese Publication No. CN102013959, Apr. 13, 2011, 18 pages.

(Continued)

*Primary Examiner* — Man U Phan
(74) *Attorney, Agent, or Firm* — Conley Rose, P.C.

(57) ABSTRACT

A method for transmission and reception in parallel on dual channels includes, when detecting that a first channel is occupied by CSMA contention, determining, by an AP, first transmission duration of a first channel data packet. The method additionally includes determining, by means of CCA detection, that a second channel is idle, where the second channel is used to transmit a second channel data packet whose transmission direction is opposite to a transmission direction of the first channel. The method additionally includes determining, by using the first transmission duration, second transmission duration for transmitting the second channel data packet, and transmitting the second channel data packet according to the second transmission duration, where an end time of transmission of the second channel data is not later than an end time of transmission of the first channel data.

18 Claims, 10 Drawing Sheets

(58) Field of Classification Search
CPC .............. H04L 27/2626; H04L 69/323; H04L 27/2613; H04L 5/0007; H04L 5/0053; H04L 5/0094; H04L 27/2666
USPC .......................................................... 370/329
See application file for complete search history.

(56) References Cited

U.S. PATENT DOCUMENTS

| | | | |
|---|---|---|---|
| 9,301,150 B2* | 3/2016 | Vermani | H04W 16/14 |
| 9,521,557 B2* | 12/2016 | Vermani | H04W 16/14 |
| 9,585,165 B2* | 2/2017 | Seok | H04W 74/08 |
| 9,867,214 B2* | 1/2018 | Porat | H04W 72/0493 |
| 10,028,272 B2* | 7/2018 | Seok | H04W 52/0216 |
| 10,045,378 B2* | 8/2018 | Xu | H04W 74/08 |
| 2011/0116401 A1 | 5/2011 | Banerjea et al. | |
| 2012/0069746 A1 | 3/2012 | Park | |
| 2012/0113806 A1 | 5/2012 | Gong et al. | |
| 2013/0176954 A1 | 7/2013 | Lv et al. | |
| 2013/0201835 A1 | 8/2013 | Banerjea et al. | |
| 2014/0355534 A1 | 12/2014 | Vermani et al. | |
| 2015/0181620 A1* | 6/2015 | Seok | H04W 74/08 370/311 |
| 2018/0035318 A1* | 2/2018 | Liu | H04B 1/56 |
| 2018/0343096 A1* | 11/2018 | Kim | H04L 5/00 |

FOREIGN PATENT DOCUMENTS

| | | |
|---|---|---|
| CN | 102595569 A | 7/2012 |
| CN | 102656941 A | 9/2012 |
| CN | 102695264 A | 9/2012 |
| CN | 103181213 A | 6/2013 |
| CN | 104702398 A | 6/2015 |
| EP | 2485436 A1 | 8/2012 |
| WO | 2011038531 A1 | 4/2011 |

OTHER PUBLICATIONS

Machine Translation and Abstract of Chinese Publication No. CN102595569, Jul. 18, 2012, 23 pages.
Machine Translation and Abstract of Chinese Publication No. CN102695264, Sep. 26, 2012, 27 pages.
Machine Translation and Abstract of Chinese Publication No. CN104702398, Jun. 10, 2015, 13 pages.
Foreign Communication From A Counterpart Application, PCT Application No. PCT/CN2015/082572, International Search Report dated Mar. 28, 2016, 7 pages.
Foreign Communication From A Counterpart Application, PCT Application No. PCT/CN2015/082572, Written Opinion dated Mar. 28, 2016, 3 pages.
Foreign Communication From A Counterpart Application, PCT Application No. PCT/CN2016/086948, English Translation of International Search Report dated Sep. 22, 2016, 2 pages.
Foreign Communication From A Counterpart Application, PCT Application No. PCT/CN2016/086948, English Translation of Written Opinion dated Sep. 22, 2016, 7 pages.
Foreign Communication From A Counterpart Application, Chinese Application No. 2016800235644, Chinese Search Report dated Jul. 28, 2019, 3 pages.
Foreign Communication From A Counterpart Application, Chinese Application No. 2016800235644, Chinese Office Action dated Aug. 2, 2019, 4 pages.

* cited by examiner

METHOD FOR TRANSMISSION AND RECEPTION IN PARALLEL ON DUAL CHANNELS, AND APPARATUS

CROSS-REFERENCE TO RELATED APPLICATIONS

This application is a continuation of International Application No. PCT/CN2016/086948, filed on Jun. 23, 2016, which claims priority to International Application No. PCT/CN2015/082572, filed on Jun. 26, 2015. The disclosures of the aforementioned applications are hereby incorporated by reference in their entireties.

TECHNICAL FIELD

The present disclosure relates to the field of communications technologies, and in particular, to a method for transmission and reception in parallel on dual channels, and an apparatus.

BACKGROUND

A wireless local access network (WLAN) is shown in FIG. 1. An access point (AP) is responsible for performing bidirectional communication with multiple stations (STA). That is, the AP sends downlink data to STAs (for example, a STA 1 and a STA 2 in FIG. 1) or receives uplink data from STAs (for example, a STA 3 and a STA 4 in FIG. 1).

A WLAN standard based on an orthogonal frequency division multiplexing (OFDM) technology appears in releases including 802.11a, 802.11n, 802.11ac, and the like. A WLAN device (an AP or a STA) obtains, by means of carrier sense multiple access (CSMA) contention, a right of using a channel, that is, first performing clear channel assessment (CCA) detection before sending data. Specifically, before sending data by using a channel, the WLAN device first receives a signal on the channel in a period of time. When an average power of the received signal exceeds a specified threshold or the received signal satisfies a period requirement, the WLAN device determines that the channel has been occupied by another device. When the average power of the received signal does not exceed a specified threshold or the received signal does not satisfy a period requirement, the WLAN device determines that the channel is in an idle state, and starts transmitting data by using the channel.

In an existing WLAN, a specific data transmission process may be a case shown in FIG. 2. In the data transmission process, an AP starts performing CCA detection on a channel at a moment t1. When determining that the channel is idle, the AP starts sending a downlink data frame to a STA 1 at a moment t2, and finishes sending the downlink data frame at a moment t3. The STA 1 receives the downlink data frame in a corresponding time. After a short inter-frame interval (SIFS) time, if the STA 1 correctly receives the downlink data frame, the STA 1 sends an acknowledgement (ACK) frame or a block acknowledgement (BA) frame to the AP at a moment t4. The AP determines, by receiving the ACK/BA frame sent by the STA 1, that the downlink data frame has been correctly received by the STA 1, thereby finishing the current downlink data transmission operation, and releases the right of using the channel. Similarly, when a STA 2 needs to send uplink data to the AP, the STA 2 performs CCA detection at a moment t5. If determining that the channel is idle, the STA 2 starts sending an uplink data frame to the AP at a moment to, and finishes sending the uplink data frame at a moment t7. After an SIFS time, if the AP correctly receives the uplink data frame, the AP sends an ACK/BA frame to the STA 2 at a moment t8. After receiving the ACK/BA frame, the STA 2 finishes the current uplink data transmission operation, and releases the right of using the channel.

In a new WLAN standard 802.11ax based on orthogonal frequency division multiple access (OFDMA), an AP may divide an entire frequency band into multiple frequency bands in an OFDMA manner, and separately send downlink data to multiple STAs simultaneously, or simultaneously receive uplink data from multiple STAs in an OFDMA manner. In a WLAN system based on OFDMA, to be compatible with an existing WLAN device, the AP still contends for a channel by means of CSMA, that is, first performing CCA detection on a channel before using the channel. If determining that the channel is idle, the AP contends for the channel. If the contention is successful, the AP occupies, for a period of time, a transmission opportunity (TXOP) for uplink or downlink transmission, or uplink and downlink cascaded transmission. If the AP needs to transmit downlink data to at least one STA, similar to the AP in the WLAN based on CSMA, the AP directly sends the downlink data frame after determining, by means of CCA detection, that the channel is idle. Multiple STAs may be multiplexed in an OFDMA manner to perform transmission. Different from the WLAN based on CSMA, STAs do not directly initiate uplink transmission by means of channel contention. Instead, STAs are scheduled to perform uplink transmission after the AP contends for the channel.

As shown in FIG. 3, when scheduling a STA 2 and a STA 3 to transmit uplink data in an OFDMA manner, an AP sends a trigger frame after obtaining, by means of CCA detection, a right of using a channel. The trigger frame indicates the STA 2 and the STA 3 that are scheduled and resources used by the STA 2 and the STA 3 to transmit the uplink data. As shown in FIG. 3, the AP sends the trigger frame at a moment t6. Then, after an SIFS time, the STA 2 and the STA 3 that are scheduled start separately sending an uplink data frame at a moment t7 by using the resources allocated by the AP. If correctly receiving the uplink data sent by the STA 2 and the STA 3, the AP finishes the current uplink transmission process after sending an ACK/BA frame. During uplink transmission, a TXOP reserved by the AP includes at least a time from the beginning of sending of the trigger frame to the end of sending of the ACK/BA frame.

The WLAN standards such as 802.11n, 802.11ac, and 802.11ax all support transmission of a multiple input and multiple output (MIMO) system. That is, multiple spatial flows are transmitted together on a same channel to achieve a higher data throughput, or each STA uses one or more spatial flows, to achieve an objective of serving more users. In this case, a transceiver of the WLAN includes at least two transmit paths and at least two receive paths. Due to limitations such as complexity and costs, a maximum path bandwidth supported by the WLAN standards including 802.11ac and 802.11ax is 160 megahertz (MHz), and a maximum quantity of spatial flows supported is 8. However, most actual WLAN devices support a maximum bandwidth of only 80 MHz.

In the WLAN system, transmission and reception in parallel (TRIP) is a solution in which a channel for uplink transmission and another channel for downlink transmission in the WLAN are simultaneously used to perform parallel transmission, so as to improve a throughput at an AP end. In the TRIP solution, although each channel may perform uplink or downlink transmission in different times, when a first channel sends data, a second channel only receives data, and when a first channel receives data, a second channel only sends data. In this way, for a WLAN device supporting transmission and reception in parallel, if a transceiver of the WLAN device includes m transmit paths and n receive paths, where m≥2, and n≥2, data may be sent on the first channel by using all the transmit paths (in transmit paths), and simultaneously, data is received on the second channel by using all the receive paths (n receive paths); or data is sent on the second channel by using all the transmit paths (m transmit paths), and simultaneously, data is received on the first channel by using all the receive paths (n receive paths). That is, a system throughput may be effectively improved by fully using processing capabilities of the existing transmit and receive paths without increasing complexity (including path bandwidths and a quantity of paths) of the transmit paths and the receive paths.

FIG. 4 shows some typical application scenarios of a TRIP solution. In FIG. 4(a), only an AP supports uplink and downlink parallel transmission while STAs do not need to support uplink and downlink parallel transmission. The AP sends downlink data to a STA 1 by using a first channel whose carrier frequency is f01, and simultaneously receives, by using a second channel whose carrier frequency is f02, uplink data sent by a STA 2. There are at least an interval of 100 MHz between a channel frequency band of the carrier frequency f01 and a channel frequency band of f02. Therefore, receiving and sending of the two channels do not interfere with each other. FIG. 4(b) is similar to FIG. 4(a). Only an AP supports uplink and downlink parallel transmission while STAs do not need to support uplink and downlink parallel transmission. The AP sends downlink data to a STA 1 and a STA 2 by using a first channel whose carrier frequency is f01, and simultaneously receives, by using a second channel whose carrier frequency is f02, uplink data sent by a STA 3 and a STA 4. The STA 1 and the STA 2 may be multiplexed on the first channel by means of OFDMA and/or downlink multi-user MIMO (MU-MIMO), and the STA 3 and the STA 4 may be multiplexed on the second channel by means of OFDMA and/or uplink MU-MIMO. In FIG. 4(c), both an AP and a STA 3 support uplink and downlink parallel transmission. The AP sends downlink data to the STA 3 by using a first channel whose carrier frequency is f01, and simultaneously receives, by using a second channel whose carrier frequency is f02, uplink data sent by the STA 3. FIG. 4(d) is similar to FIG. 4(c). An AP, a STA 1, and a STA 2 all support uplink and downlink parallel transmission, but a STA 3 and a STA 4 do not support uplink and downlink parallel transmission. The AP sends downlink data to the STA 1, the STA 2, and the STA 4 by using a first channel whose carrier frequency is f01, and simultaneously receives, by using a second channel whose carrier frequency is f02, uplink data sent by the STA 1, the STA 2, and the STA 3.

FIG. 5 shows a typical data transmission process of TRIP in the prior art. A scenario of this embodiment is shown in FIG. 4(a) and FIG. 4(b). Only an AP performs uplink and downlink parallel transmission while STAs do not perform uplink and downlink parallel transmission. Using the scenario shown in FIG. 4(a) as an example, the AP sends downlink data to the STA 1 by using the first channel whose carrier frequency is f01, and simultaneously receives, by using the second channel whose carrier frequency is f02, uplink data sent by the STA 2. As shown in FIG. 5, the AP performs, at a moment t1, CCA detection on the first channel by using at least one but no more than n−1 receive paths, and performs CCA detection on the second channel by using remaining at least one receive path. If both the first channel and the second channel are idle, the AP reserves a TXOP for uplink and downlink parallel transmission. After an SIFS time, the AP sends a first trigger frame on the first channel at a moment t2 by using at least one but no more than m−1 transmit paths, to send downlink transmission scheduling control information, and simultaneously sends a second trigger frame on the second channel by using remaining at least one transmit path, to send uplink transmission scheduling control information. The scheduling control information includes, but is not limited to, information such as identifiers of STAs that perform uplink or downlink data transmission after a trigger frame, transmission resources (for example, subcarrier resourced of a frequency domain) used by the STAs to perform data transmission, a quantity of spatial flows and corresponding identifiers of the spatial flows, a modulation coding scheme (MCS) used to transmit a corresponding spatial flow, and the like. After the SIFS time, the AP may send a downlink data frame on the first channel at a moment t3 by using all the m transmit paths. At the same time, the STA 2 sends, at the moment t3 according to the uplink transmission scheduling control information sent by the second trigger frame, an uplink data frame to the AP on the second channel. The AP may receive, on the second channel, the uplink data frame by using all then receive paths. In the SIFS time after transmission of the uplink and downlink data frames is finished, if the STA 1 correctly receives the downlink data frame sent by the AP, the STA 1 sends an uplink ACK/BA frame to the AP at a moment t4. Moreover, if the AP correctly receives the uplink data frame sent by the STA 2, the AP also sends a downlink ACK/BA frame to the STA 1 at the moment t4. In an ACK/BA frame transmission phase, the AP may send, on the second channel, the downlink ACK/BA frame by using all the m transmit paths, or may receive, on the first channel, the uplink ACK/BA frame by using all the n receive paths. Lengths of the uplink ACK/BA frame and the downlink the ACK/BA frame may be different. The TXOP reserved by the AP should include a time from the moment t2 when the trigger frame is sent to a moment when transmission of a relatively long frame in the uplink and downlink ACK/BA frames is finished.

In conclusion, in the TRIP solution, all receive paths and transmit paths on an AP can be fully used for transmission, and a throughput of the AP is improved by using one of dual channels for receiving and the other for sending. However, the TRIP solution has the following conditions in application:

In a frequency band at which an AP works, the AP needs to find two idle channels to perform receiving and sending.

Both a receive path and a transmit path of the AP need to be in an idle state.

According to a core idea of TRIP, if a STA occupies, in the uplink or downlink, an operating channel and receive and transmit paths of the AP by means of CSMA, the AP may schedule, when the other channel is idle, a service in an opposite direction to occupy the channel. For example, when the STA performs uplink transmission by means of CSMA, the AP provides a downlink transmission service on the other channel. However, an uplink transmission time of the STA is not necessarily known at an AP end when transmission begins. If the AP performs scheduling and transmission according to a downlink transmission requirement of the AP without knowing the uplink transmission time, a case in which uplink transmission is finished while downlink transmission has not finished may occur. In this case, the downlink transmission at the AP end occupies all or most of transmit paths. Therefore, the AP can perform only uplink receiving on an idle channel on which the uplink transmission is finished. The cycle repeats. Due to a misaligned state between the uplink and downlink, one channel of the AP keeps performing uplink transmission, while the other channel keeps performing downlink transmission. Consequently, the dual channels are locked. As a result, in the channel keeping performing uplink transmission, a downlink service times out, while in the channel keeping performing downlink transmission, an uplink service also times out. Consequently, a principle of contention fairness of the WLAN is violated.

SUMMARY

The present disclosure provides a method for transmission and reception in parallel on dual channels, and an apparatus. By means of the method and the apparatus that are provided in the present disclosure, a prior-art problem that dual channels are locked when dual-channel receiving and sending are performed by using a TRIP solution is resolved.

According to a first aspect, a method for transmission and reception in parallel on dual channels is provided, where the method includes when detecting that a first channel is occupied by carrier sense multiple access CSMA contention, determining, by an AP, first transmission duration of a first channel data packet transmitted on the first channel; determining, by means of clear channel assessment CCA detection, that a second channel is idle, where the second channel is used to transmit a second channel data packet, and a transmission direction of the second channel data packet and a transmission direction of the first channel data packet are opposite; and determining, by using the first transmission duration, second transmission duration corresponding to the second channel data packet, and transmitting the second channel data packet on the second channel according to the second transmission duration, where an end time of transmission of the second channel data is not later than an end time of transmission of the first channel data.

According to a second aspect, an AP is provided, where the AP includes a determining module, configured to: when it is detected that a first channel is occupied by carrier sense multiple access CSMA contention, determine first transmission duration of a first channel data packet transmitted on the first channel; a detection module, configured to determine, by means of clear channel assessment CCA detection, that a second channel is idle, where the second channel is used to transmit a second channel data packet, and a transmission direction of the second channel data packet and a transmission direction of the first channel data packet are opposite; and a transmission module, configured to: determine, by using the first transmission duration, second transmission duration corresponding to the second channel data packet, and transmit the second channel data packet on the second channel according to the second transmission duration, where an end time of transmission of the second channel data is not later than an end time of transmission of the first channel data.

One or two of the foregoing technical solutions have at least the following technical effects: By means of the method for transmission and reception in parallel on dual channels and the apparatus that are provided in the present disclosure, a system throughput may be effectively improved by fully using processing capabilities of existing transmit and receive paths without increasing complexity (including path bandwidths and a quantity of paths) of the transmit paths and the receive paths.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The following further describes the embodiments of the present disclosure in detail with reference to this specification.

Embodiment 1

Figure 1:
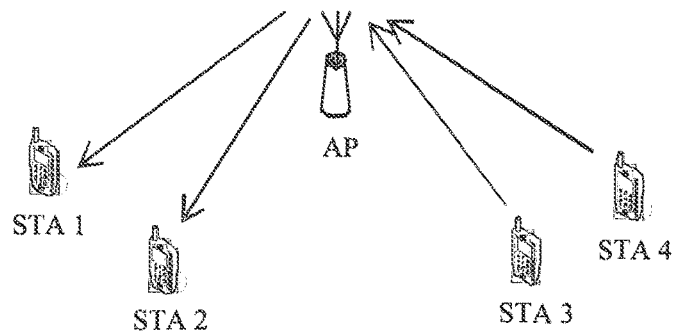
FIG. 1 is a schematic diagram of an application scenario of a WLAN in the prior art.
Figure 2:
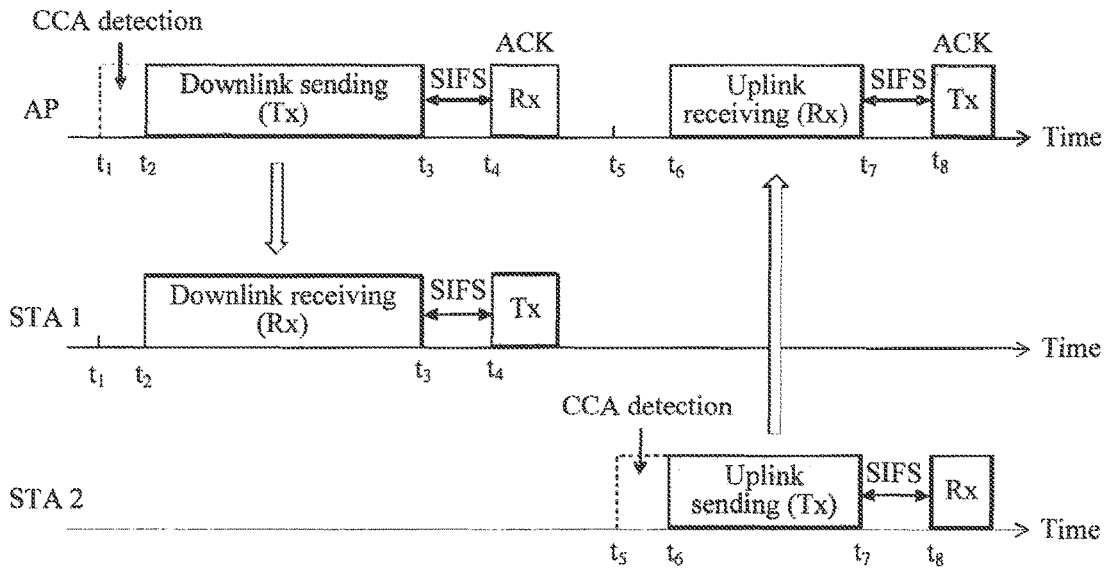
FIG. 2 is a schematic diagram of data transmission based on CSMA in an existing WLAN.
Figure 3:
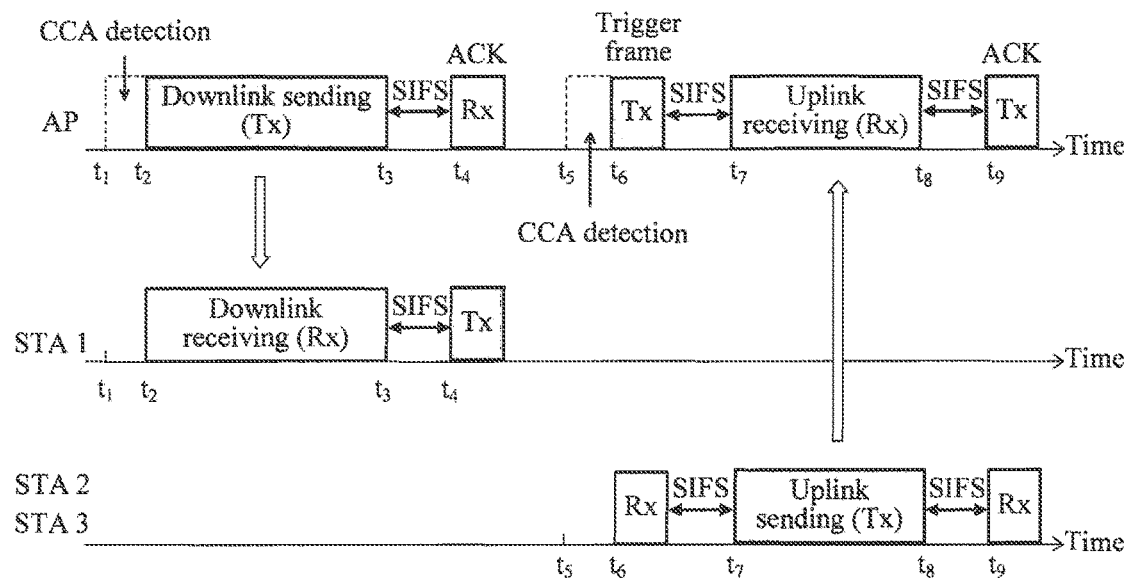
FIG. 3 is a schematic diagram of data transmission based on OFDMA in an existing WLAN.
Figure 4:
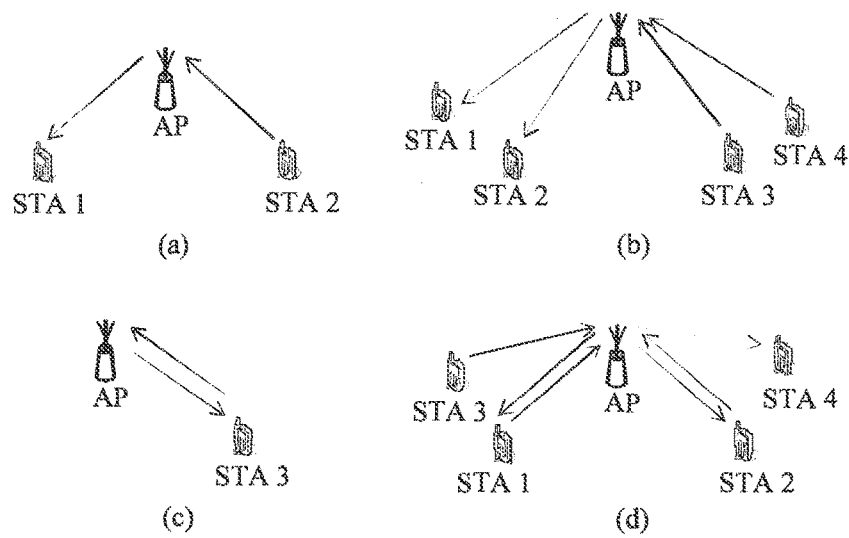
FIG. 4 is a schematic diagram of a typical application scenario of TRIP in the prior art.
Figure 5:
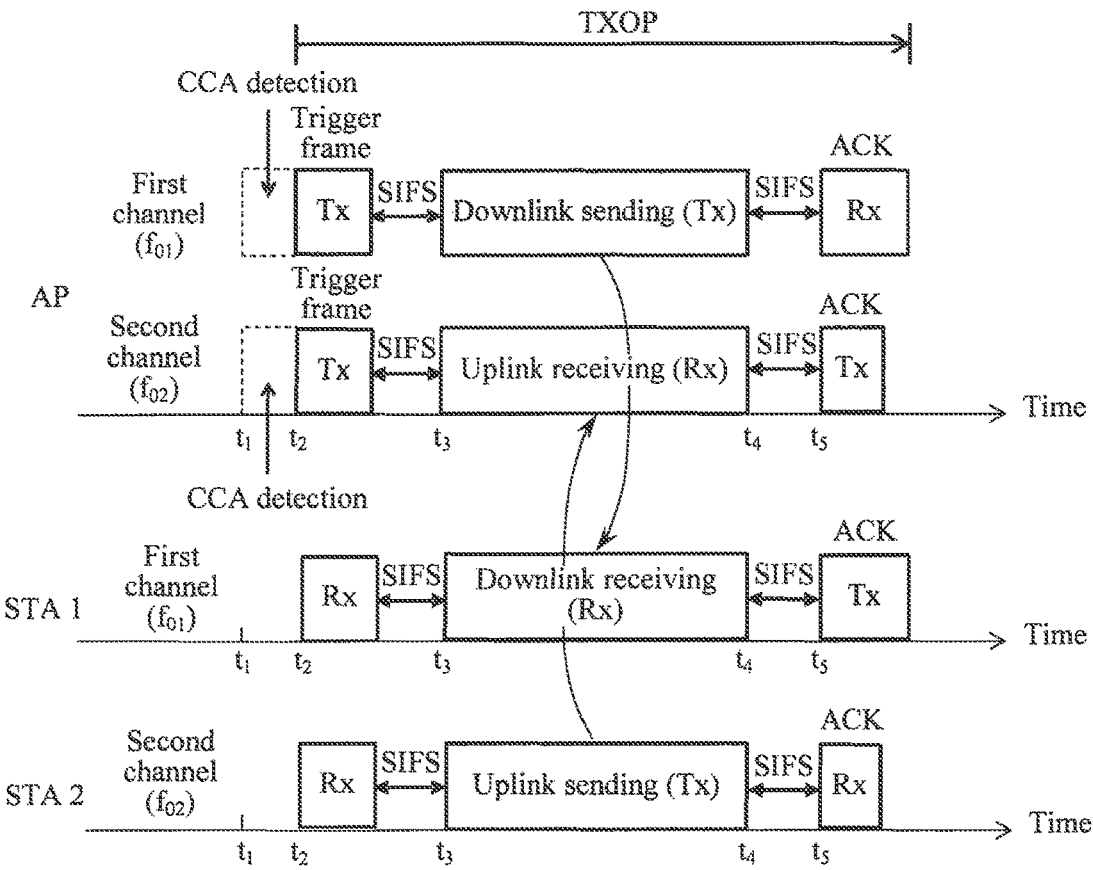
FIG. 5 is a schematic diagram of a data transmission process of a TRIP solution in the prior art.
Figure 6:
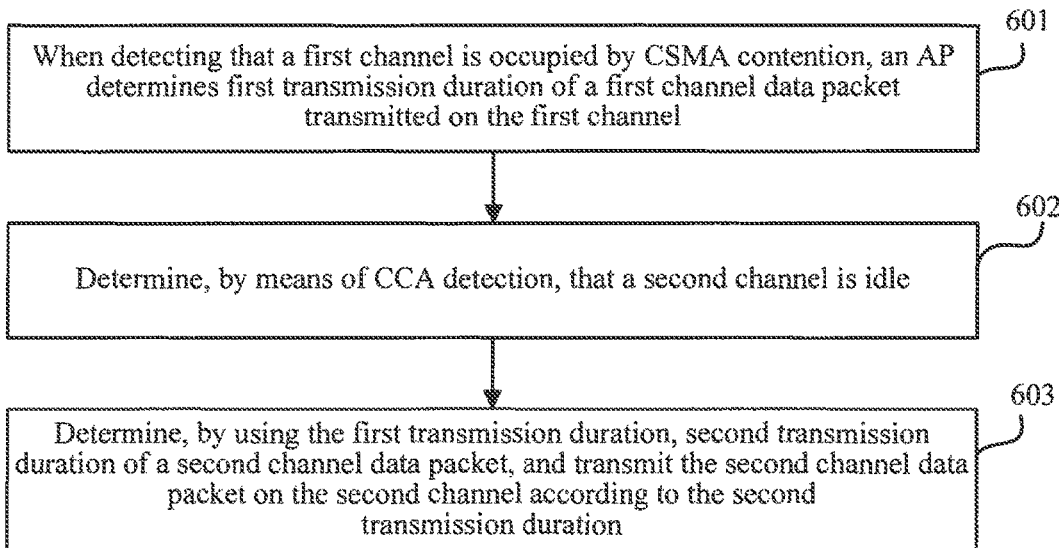
FIG. 6 is a schematic flowchart of a method for transmission and reception in parallel on dual channels according to Embodiment 1 of the present disclosure.

As shown in FIG. 6, this embodiment of the present disclosure provides a method for transmission and reception in parallel on dual channels. The method specifically includes the following steps.

Step 601: When detecting that a first channel is occupied by CSMA contention, an AP determines first transmission duration of a first channel data packet transmitted on the first channel.

The AP only knows transmission duration of downlink data, while transmission duration of uplink data needs to be determined in a particular manner. Therefore, when the first channel is used to transmit the uplink data, a specific implementation manner for determining the first transmission duration of the first channel data packet transmitted on the first channel may be: detecting whether there is transmission information including transmission duration of a data packet before the first channel data packet is transmitted; and if yes, obtaining the first transmission duration of the first channel data packet from the transmission information; or if not, parsing preamble information of the first channel data packet, and obtaining the first transmission duration of the first channel data packet from the preamble information.

The transmission information may be a request to send/clear to send (RTS/CTS) frame, a resource request (RR) message, or power save poll (PS-Poll). The foregoing pieces of transmission information are merely several specific instances, and the transmission information in this embodiment of the present disclosure is not limited thereto. In specific application, transmission information including the transmission duration of the data packet is feasible.

Step 602: Determine, by means of CCA detection, that a second channel is idle, where the second channel is used to transmit a second channel data packet, and a transmission direction of the second channel data packet and a transmission direction of the first channel data packet are opposite.

A transmission direction of the second channel data packet and a transmission direction of the first channel data packet being opposite is specifically: when the second channel data packet is transmitted in an uplink direction, the first channel data packet is transmitted in a downlink direction; or when the second channel data packet is transmitted in a downlink direction, the first channel data packet is transmitted in an uplink direction.

In this embodiment of the present disclosure, CCA detection in step 602 is an independently implemented process, and is not affected by step 601. Therefore, during specific implementation of the solution, the CCA detection may be performed simultaneously with step 601 or may be performed at a moment in a process of performing step 601.

Step 603: Determine, by using the first transmission duration, second transmission duration of the second channel data packet, and transmit the second channel data packet on the second channel according to the second transmission duration, where an end time of transmission of the second channel data is not later than an end time of transmission of the first channel data.

The end time of the transmission of the second channel data is not later than the end time of the transmission of the first channel data. Therefore, when the first channel is used to transmit uplink data, a method for determining the second transmission duration of the second channel data packet by using the first transmission duration may be: if the AP does not obtain the first transmission duration before the first channel initiates uplink transmission, determining that the second transmission duration is remaining duration after duration occupied by parsing the preamble information is subtracted from the first transmission duration; or that the second transmission duration is remaining duration after duration occupied by parsing the preamble information and duration occupied by the CCA detection are subtracted from the first transmission duration; or if the AP obtains the first transmission duration before the first channel initiates uplink transmission, determining that the second transmission duration is the same as the first transmission duration; or that the second transmission duration is remaining duration after duration occupied by the CCA detection is subtracted from the first transmission duration.

To describe the solution provided in this embodiment of the present disclosure in detail, the solution in the present disclosure is further described with reference to different cases.

Figure 6A:
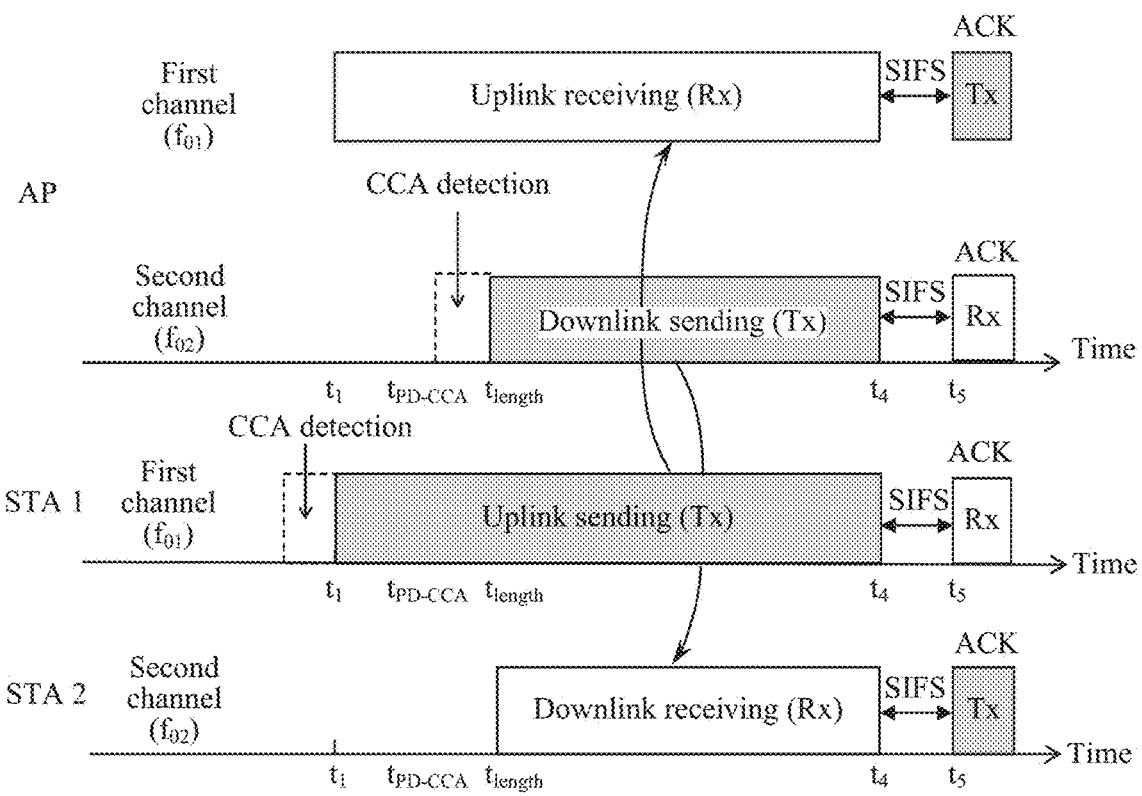
FIG. 6(a) is a schematic diagram of a first uplink and downlink WLAN data transmission manner according to Embodiment 1 of the present disclosure.

In a first manner, as shown in FIG. 6(a), before a moment t1, the AP simultaneously performs CCA detection on two channels to detect a possible uplink packet. At the moment t1, a STA 1 initiates uplink transmission on the first channel. In this case, the AP starts receiving, by using a receive path, an uplink packet sent by the STA 1. After a time of $t_{PD\_CCA}$ (a range of $t_{PD\_CCA}$ is usually 0 to 8 us), the AP finds, by means of a packet detection process, that there is an uplink data packet. Then, the AP receives uplink transmission on the first channel by using at least one but no more than n−1 receive paths. In this case, CCA detection is performed on the other receive path on the second channel. After a time of $t_{length}$ (a range of $t_{length}$ is usually 28 us to 36 us), the AP obtains duration information of the uplink packet by parsing preamble information of the uplink packet, that is, $t_{UL}$. In this case, the AP receives uplink transmission on the first channel by using n−1 receive paths. After the duration information of the uplink packet is obtained at the AP end, the AP queries a CCA detection result on the second channel. If the second channel is idle and the AP has a downlink data transmission need (for example, the AP needs to send a downlink data frame to a STA 2), the AP starts downlink transmission by using all the m transmit paths. A maximum value $t_{DL,\ max}$ of the downlink transmission duration at the AP end is: $t_{DL,\ max} = t_{UL} - t_{length}$.

In this embodiment, after the duration information of the uplink packet is obtained, whether to transmit downlink data is further determined according to the duration information. If maximum uplink transmission duration $t_{UL,\ max}$ is less than a duration threshold or the downlink data is too small, the AP may choose not to send the downlink packet. After a period of time of sending, receiving of the uplink data and transmission of the downlink data at the AP end are simultaneously finished at t4.

After transmission of an uplink data frame and transmission of a downlink data frame are finished and an SIFS time elapses, if the AP correctly receives the uplink data frame sent by the STA 1, the AP sends a downlink ACK/BA frame to the STA 1 at a moment t5. Moreover, if the STA 2 correctly receives the downlink data frame sent by the AP the STA 2 also sends an uplink ACK/BA frame to the AP at the moment t5. In a transmission phase of an ACK/BA frame, the AP may send the downlink ACK/BA frame on the first channel by using all transmit paths (m transmit paths), or may receive the uplink ACK/BA frame on the second channel by using all the n receive paths. Lengths of the uplink ACK/BA frame and the downlink ACK/BA frame may be different.

In the foregoing manner, an AP obtains duration information of the uplink packet by parsing preamble information of the uplink packet. In an application, the AP may further obtain the duration information of the uplink packet from transmission information including transmission duration of a data packet. An example in which the transmission information is an RTS frame is used below to further describe the method in this embodiment of the present disclosure.

Figure 6B:
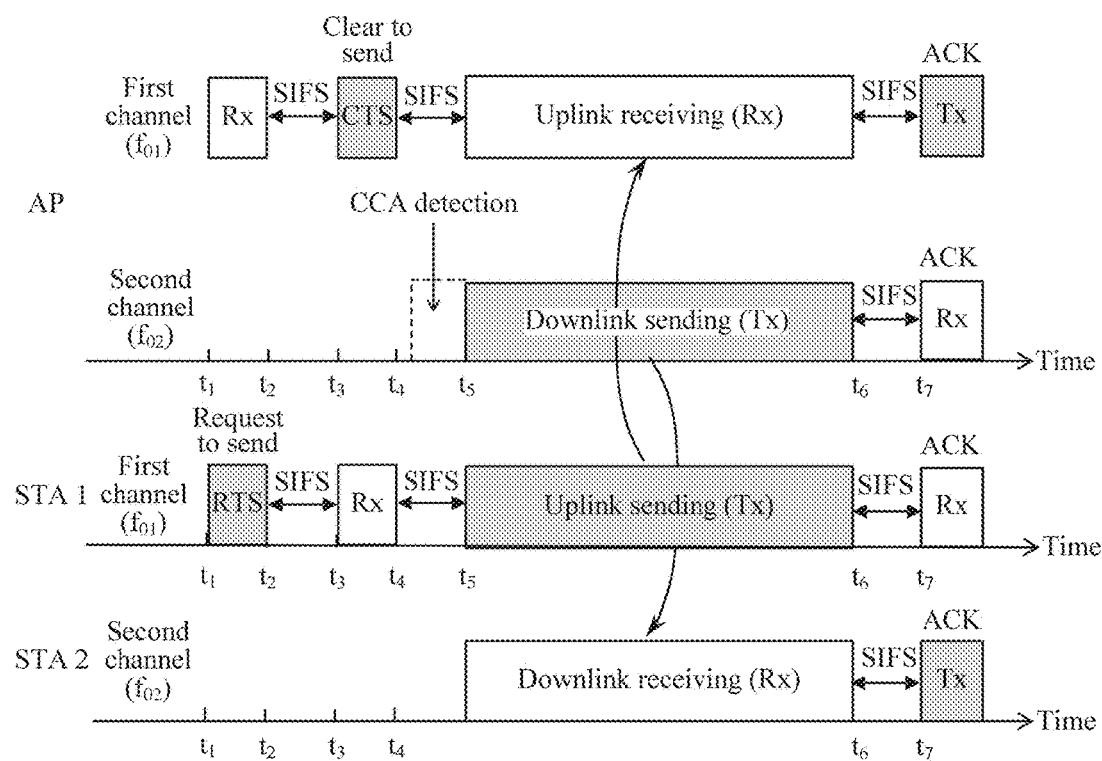
FIG. 6(b) is a schematic diagram of a second uplink and downlink N data transmission manner according to Embodiment 1 of the present disclosure.

In a second method, as shown in FIG. 6(b), at the moment t1, a STA 1 having a transmission need sends an RTS frame to the AP, and finishes transmission at a moment t2. The AP performs CCA detection on the first channel by using at least one but no more than n−1 receive paths, and performs CCA detection on the second channel by using remaining at least one receive path. After the RTS frame is received at the AP end, it is identified whether the RTS frame is a transmission packet for the AP end. If the RTS frame is a transmission packet for the AP end, after SIFS duration, a CTS frame is sent to the STA 1 at a moment t3, and sending is finished at a moment t4. After receiving the CTS frame, and after an SIFS delay, the STA 1 initiates uplink transmission at a moment t5. In this case, the AP receives uplink transmission of the STA on the first channel by using n−1 receive paths, and performs CCA detection on the second channel by using one remaining receive path. Because the AP knows an uplink initiation time and the uplink transmission duration of the STA 1, the AP may perform downlink transmission (for example, send downlink data to a STA 2) on the second channel by using all the m transmit paths. A maximum value $t_{DL, \ max}$ of the downlink transmission duration is $t_{DL, \ max} = t_{UL}$.

In this process, if the maximum uplink transmission duration $t_{UL, \ max}$ is less than a duration threshold or the downlink data is too small, the AP may choose not to send the downlink packet. After a period of time of sending, receiving of the uplink data and transmission of the downlink data at the AP end are finished at t6.

After transmission of an uplink data frame and transmission of a downlink data frame are finished and an SIFS time elapses, if the AP correctly receives the uplink data frame sent by the STA 1, the AP sends a downlink ACK/BA frame to the STA 1 at a moment t7. Moreover, if the STA 2 correctly receives the downlink data frame sent by the AP, the STA 2 also sends an uplink ACK/BA frame to the AP at the moment t7. In a transmission phase of an ACK/BA frame, the AP may send the downlink ACK/BA frame on the first channel by using all the m transmit paths, or may receive the uplink ACK/BA frame on the second channel by using all the n receive paths. Lengths of the uplink ACK/BA frame and the downlink ACK/BA frame may be different.

According to a core idea of the existing TRIP, if a STA occupies, in the unlink or downlink, an operating channel and receive and transmit paths of the AP by means of CSMA, the AP may schedule, when the other channel is idle, a service in an opposite direction to occupy the channel. For example, when the STA performs uplink transmission by means of CSMA, the AP provides a downlink transmission service on the other channel. However, an uplink transmission time of the STA is not necessarily known at an AP end when transmission begins. If the AP performs scheduling and transmission according to a downlink transmission requirement of the AP without knowing the uplink transmission time, a case in which uplink transmission is finished while downlink transmission has not finished may occur. In this case, the downlink transmission at the AP end occupies all or most of transmit paths. Therefore, the AP can perform only uplink receiving on an idle channel on which the uplink transmission is finished. The cycle repeats. Due to a misaligned state between the uplink and downlink, one channel of the AP keeps performing reception of uplink transmission, while the other channel keeps performing sending of downlink transmission. Consequently, the dual channels are locked. For the problem in the prior art, in the method which is provided in the present disclosure and in which transmission and reception in parallel on dual channels in a WLAN is compatible with a CSMA user, maximum duration of transmission initiated by the AP end needs to be adjusted according to transmission duration of CSMA contention access of a STA, so as to avoid a case in which the dual channels are locked. Therefore, by means of the solution which is provided in the present disclosure and in which transmission and reception in parallel on dual channels is compatible to a CSMA user, an entire system throughput is improved when a CSMA user occupies an operating channel of the AP and occupies some receive paths and transmit paths of the AP.

In this embodiment, to avoid the case that the dual channels are locked, the AP schedules a packet length of a downlink packet, so that an end time of the downlink packet is not later than an end time of an uplink data packet of a STA. In this case, the AP may select a proper STA and a proper data volume for transmission by scheduling downlink transmission of multiple STAs, thereby ensuring that an end time of the uplink data frame and an end time of the downlink data frame are the same or close. If there is packet length alignment requirement, when a data volume of the downlink packet is small, downlink transmission may be successively initiated twice or multiple times, to ensure a synchronization requirement that uplink and downlink are simultaneously finished. In addition, padding may be performed at a Media Access Control (MAC) layer or a physical layer to ensure that lengths of the uplink data frame and the downlink data frame are the same. A padding method at the MAC layer or the physical layer may be implemented by using a method in an existing WLAN technology.

In addition, downlink transmission scheduled by the AP may be performed for multiple STAs. Data transmission of multiple downlink STAs may be served by using OFDMA or a MU-MIMO system.

Duration of an uplink data packet of a STA is detected, and a second channel is properly scheduled for downlink transmission. Therefore, the solution provided in this embodiment can support simultaneous working of m transmit paths and n−1 receive paths. When m=n>2, a beneficial effect of approximately doubling a throughput of an AP can be achieved.

Embodiment 2

When a STA accesses a channel by means of CSMA contention and occupies a receive path of an AP, the AP schedules downlink transmission to improve a throughput. In this scenario, before the STA initiates transmission, the AP does not know duration of uplink transmission of the STA. Therefore, in a transmission process, the AP first needs to obtain a length of an uplink packet first, and then schedules downlink transmission (a CSMA data packet is transmitted in downlink in this embodiment).

Before the CSMA data packet is transmitted, a backoff operation needs to be performed. Therefore, in this embodiment, before a second channel data packet is transmitted on second channel according to a second transmission duration, the method further includes initiating a backoff operation, and transmitting the second channel data packet on the second channel according to the second transmission duration when the backoff operation is finished, where correspondingly, transmission duration of the second channel data packet is remaining duration after duration occupied by the backoff operation is subtracted from the second transmission duration.

Figure 7:
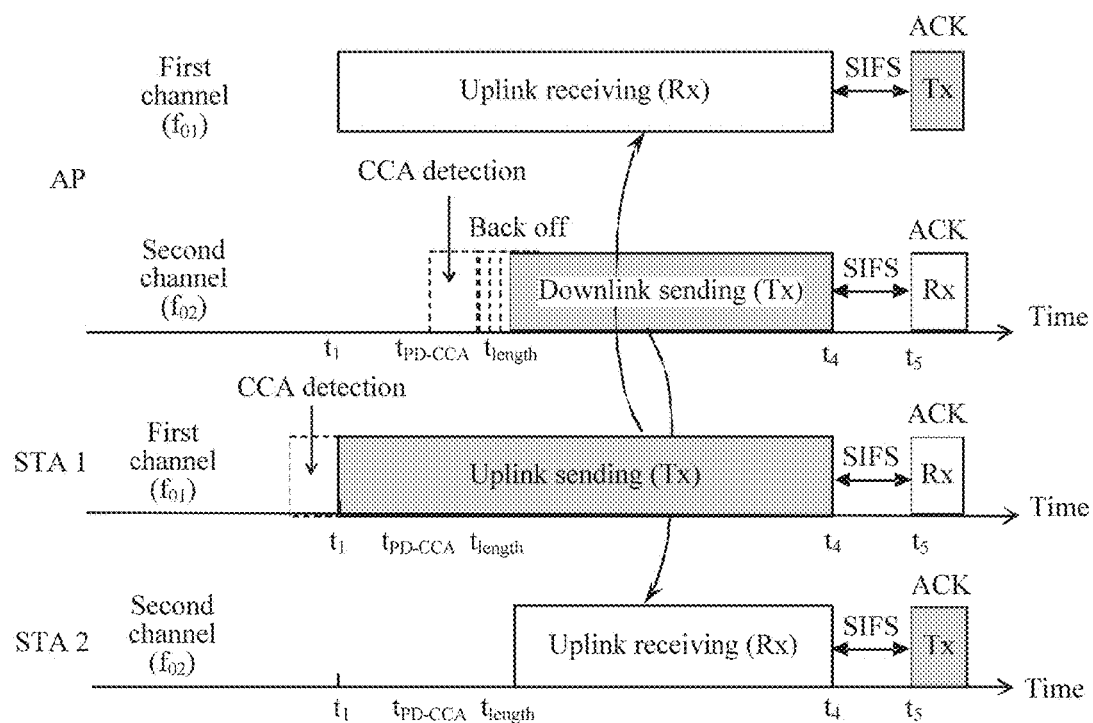
FIG. 7 is a schematic diagram of an uplink and downlink WLAN data transmission process according to Embodiment 2 of the present disclosure.

For the foregoing case, in the specific use environment, a specific process of transmitting a data packet by using the method provided in this embodiment of the present disclosure is shown in FIG. 7, specifically including receiving, by the AP by using a first channel whose carrier frequency is f01, uplink data sent by a STA 2, and simultaneously sending downlink data to a STA 1 by using a second channel whose carrier frequency is f02. During specific implementation, the first channel and the second channel are not constant, a channel that first receives uplink transmission is used as the first channel, and the other channel is used as the second channel.

Before a moment t1, the AP simultaneously performs CCA detection on two channels to detect a possible uplink packet. At the moment t1, the STA 1 initiates uplink transmission on the first channel. In this case, the AP starts receiving, by using a receive path, an uplink packet sent by the STA 1. After a time of $t_{PD\_CCA}$ (a range of $t_{PD\_CCA}$ is usually 0 to 8 us), the AP finds, by means of a packet detection process, that there is an uplink data packet. Then, the AP receives uplink transmission on the first channel by using at least one but no more than n−1 receive paths. In this case, CCA detection is performed on the other receive path on the second channel. After a time of $t_{length}$ (a range of $t_{length}$ is usually 28 us to 36 us), the AP obtains duration information of the uplink packet by parsing preamble information of the uplink packet, that is, $t_{UL}$. In this case, the AP receives uplink transmission on the first channel by using n−1 receive paths. After the duration information of the uplink packet is obtained at the AP end, the AP queries a CCA detection result on the second channel. If the second channel is idle and the AP has a downlink data transmission need, the AP starts a backoff mechanism. When backoff is finished and the channel is still idle, the AP starts downlink transmission by using all the m transmit paths. To avoid a case that dual channels are locked, a maximum value $t_{DL,\ max}$ of the downlink transmission duration at the AP end is: $t_{DL,\ max}=t_{UL}-t_{length}-t_{backoff}$ (where $t_{backoff}$ is backoff duration of the AP on the second channel).

In this process, if the maximum uplink transmission t duration $t_{UL,\ max}$ is less than a duration threshold or the downlink data is too small, the AP may choose not to send the downlink packet. After a period of time of sending, receiving of the uplink data and transmission of the downlink data at the AP end are simultaneously finished at t4.

After transmission of an uplink data frame and transmission of a downlink data frame are finished and an SIFS time elapses, if the AP correctly receives the uplink data frame sent by the STA 1, the AP sends a downlink ACK/BA frame to the STA 1 at a moment t5. Moreover, if the STA 2 correctly receives the downlink data frame sent by the AP, the STA 2 also sends an uplink ACK/BA frame to the AP at the moment t5. In a transmission phase of an ACK/BA frame, the AP may send the downlink ACK/BA frame on the first channel by using all transmit paths (m transmit paths), or may receive the uplink ACK/BA frame on the second channel by using all the n receive paths. Lengths of the uplink ACK/BA frame and the downlink ACK/BA frame may be different.

In this embodiment, to avoid the case that the dual channels are locked, the AP schedules a packet length of a downlink packet, so that an end time of the downlink packet is not later than an end time of an uplink data packet of a STA. In this case, the AP may select a proper STA and a proper data volume for transmission by scheduling downlink transmission of multiple STAs, thereby ensuring that an end time of the uplink data frame and an end time of the downlink data frame are the same or close. If there is a packet length alignment requirement, when a data volume of the downlink packet is small, downlink transmission may be successively initiated twice or multiple times, to ensure a synchronization requirement that uplink and downlink are simultaneously finished. In addition, padding (padding) may be performed at a MAC layer or a physical layer to ensure that lengths of the uplink data frame and the downlink data frame are the same. A padding method at the MAC layer or the physical layer may be implemented by using a method in an existing WLAN technology.

In addition, downlink transmission scheduled by the AP may be performed for multiple STAs. Data transmission of multiple downlink STAs may be served by using OFDMA or a MU-MIMO system.

In the solution provided in this embodiment, duration of an uplink data packet is detected, and a second channel is properly scheduled for downlink transmission. Therefore, simultaneous working of m transmit paths and receive paths can be supported. When m=n>2, a beneficial effect of approximately doubling a throughput of an AP can be achieved.

Embodiment 3

Figure 8:
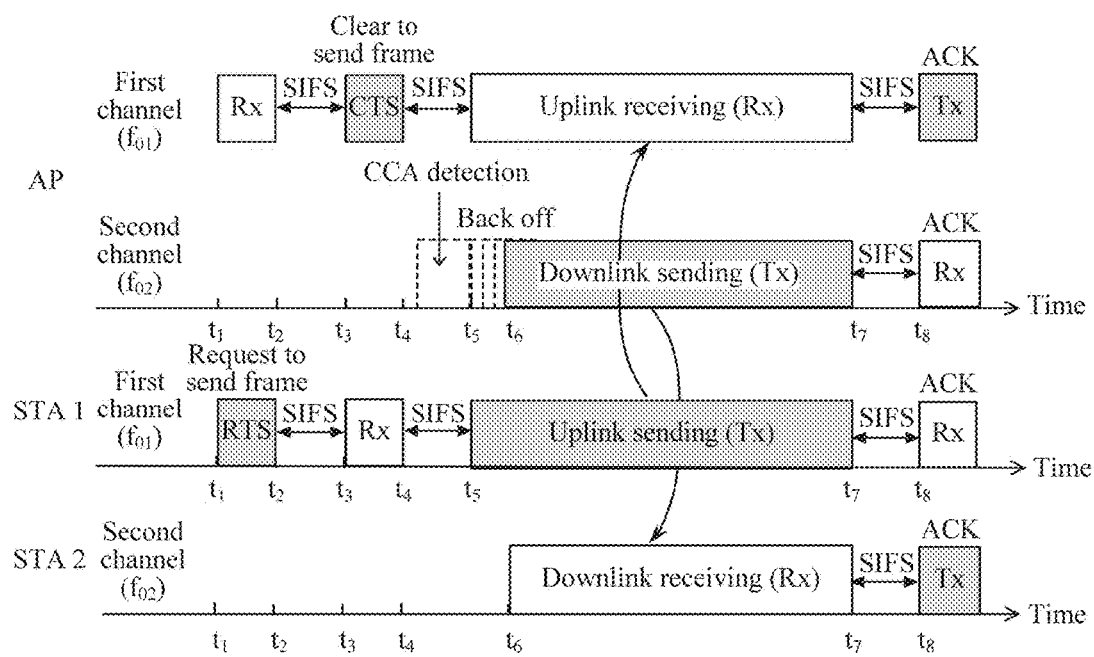
FIG. 8 is a schematic diagram of an uplink and downlink WLAN data transmission process according to Embodiment 3 of the present disclosure.

A scenario of this embodiment is that after a STA sends a RTS frame to an AP, and the AP sends a clear to send ( ) frame, when uplink transmission initiated by the STA accesses a channel and occupies a receive path of the AP, the AP schedules downlink transmission to improve a throughput. In this embodiment, before the STA initiates uplink transmission, the AP determines duration of uplink transmission of the STA by means of RTS/CTS interaction before data is sent. It should be noted that the RTS/CTS interaction between the STA and the AP is not necessarily performed only one round. There may be multiple rounds of RTS/CTS interaction, or the RTS/CTS interaction may even be multi-user RTS/CTS interaction after the AP initiates a trigger frame. A transmission process in this embodiment is shown in FIG. 8, including receiving, by the AP by using a first channel whose carrier frequency is f01, uplink data sent by a STA 2, and simultaneously sending downlink data to a STA 1 by using a second channel whose carrier frequency is f02. During an implementation, the first channel and the second channel are not constant, a channel that first receives uplink transmission is used as the first channel, and the other channel is used as the second channel.

At a moment t1, the STA 1 having a transmission need sends an RTS frame to the AP, and finishes transmission at a moment t2. The AP performs CCA detection on the first channel by using at least one but no more than n−1 receive paths, and performs CCA detection on the second channel by using remaining at least one receive path. After the RTS frame is received at the AP end, it is identified whether the RTS frame is a transmission packet for the AP end. If yes, after SIFS duration, a CTS frame is sent to the STA 1 at a moment t3, and sending is finished at a moment t4. After receiving the CTS frame, and after an SIFS delay, the STA 1 initiates uplink transmission at a moment t5. In this case, the AP receives uplink transmission of the STA on the first channel by using n−1 receive paths, and performs CCA detection on the second channel by using one remaining receive path. Because the AP knows an uplink initiation time and the uplink transmission duration of the STA 1, the AP may initiate backoff (backoff duration is $t_{backoff}$) on the second channel, and perform downlink transmission by using all the m transmit paths after the backoff is finished. A maximum value $t_{DL,\ max}$ of the downlink transmission duration is: $t_{DL,\ max}=t_{UL}-t_{backoff}$ (where $t_{backoff}$ is backoff duration of the AP on the second channel).

After a period of time of sending, receiving of the uplink data and transmission of the downlink data at the AP end are finished at t7.

After transmission of an uplink data frame and transmission of a downlink data frame are finished and an SIFS time elapses, if the AP correctly receives the uplink data frame sent by the STA 1, the AP sends a downlink ACK/BA frame to the STA 1 at a moment t8. Moreover, if the STA 2 correctly receives the downlink data frame sent by the AP the STA 2 also sends an uplink ACK/BA frame to the AP at the moment t8. In a transmission phase of an ACK/BA frame, the AP may send the downlink ACK/BA frame on the first channel by using all the m transmit paths, or may receive the uplink ACK/BA frame on the second channel by using all the n receive paths. Lengths of the uplink ACK/BA frame and the downlink ACK/BA frame may be different.

In this embodiment, to avoid the case that the dual channels are locked, the AP schedules a packet length of a downlink packet, so that an end time of the downlink packet is not later than an end time of an uplink data packet of a STA. In this case, the AP may select a proper STA and a proper data volume for transmission by scheduling downlink transmission of multiple STAs, thereby ensuring that an end time of the uplink data frame and an end time of the downlink data frame are the same or close. If there is a packet length alignment requirement, when a data volume of the downlink packet is small, downlink transmission may be successively initiated twice or multiple times, to ensure a synchronization requirement that uplink and downlink are simultaneously finished. Alternatively, padding may be performed at a MAC layer or a physical layer to ensure that lengths of the uplink data frame and the downlink data frame are the same. A padding method at the MAC layer or the physical layer may be implemented by using a method in an existing WLAN technology.

In addition, downlink transmission scheduled by the AP may be performed for multiple STAs. Data transmission of multiple downlink STAs may be served by using OFDMA or a MU-MIMO system.

In addition, an RTS/CTS interaction mechanism in this embodiment is not unique. This solution is applicable to other mechanisms similar to the RTS/CTS interaction mechanism in a WLAN system, for example, a multi-round polling mechanism or multi-round RTS/CTS interaction. It is even feasible that the AP sends a trigger frame to initiate multi-round transmission.

The AP properly schedules the second channel to perform downlink transmission. In this embodiment, simultaneously working of m transmit paths and n−1 receive paths can be supported. When m=n>2, a throughput of the AP may be doubled approximately.

In Embodiment 1, Embodiment 2, and Embodiment 3, the AP has m transmit paths and n receive paths. M is a maximum quantity of transmit paths of the AP, and n is a maximum quantity of receive paths of the AP. The AP supports using the n−1 receive paths on the first channel to receive uplink transmission, and simultaneously supports using the m transmit paths on a second channel to send downlink transmission. In addition, a sum of a quantity of transmit paths and a quantity of receive paths that are simultaneously used on the first channel and the second channel is greater than a larger value between m and n.

Embodiment 4

This embodiment is for a scenario in which an AP has a downlink service need for a STA. When the AP accesses a channel by means of CSMA contention (that is, in Embodiment 1, the first channel is used to transmit downlink data), the AP schedules uplink transmission on the other channel to improve a throughput (that is, the AP schedules a second channel for uplink transmission). In this scenario, before the AP initiates downlink transmission, the AP already knows duration of the downlink transmission. Therefore, the AP may schedule duration of uplink transmission of the other channel according to the duration of the downlink transmission. The determining, by using the first transmission duration, second transmission duration of the second channel data packet may be: determining that the second transmission duration is remaining duration after duration occupied by the AP to schedule the second channel and duration occupied by an inter-frame interval are subtracted from the first transmission duration.

Figure 9:
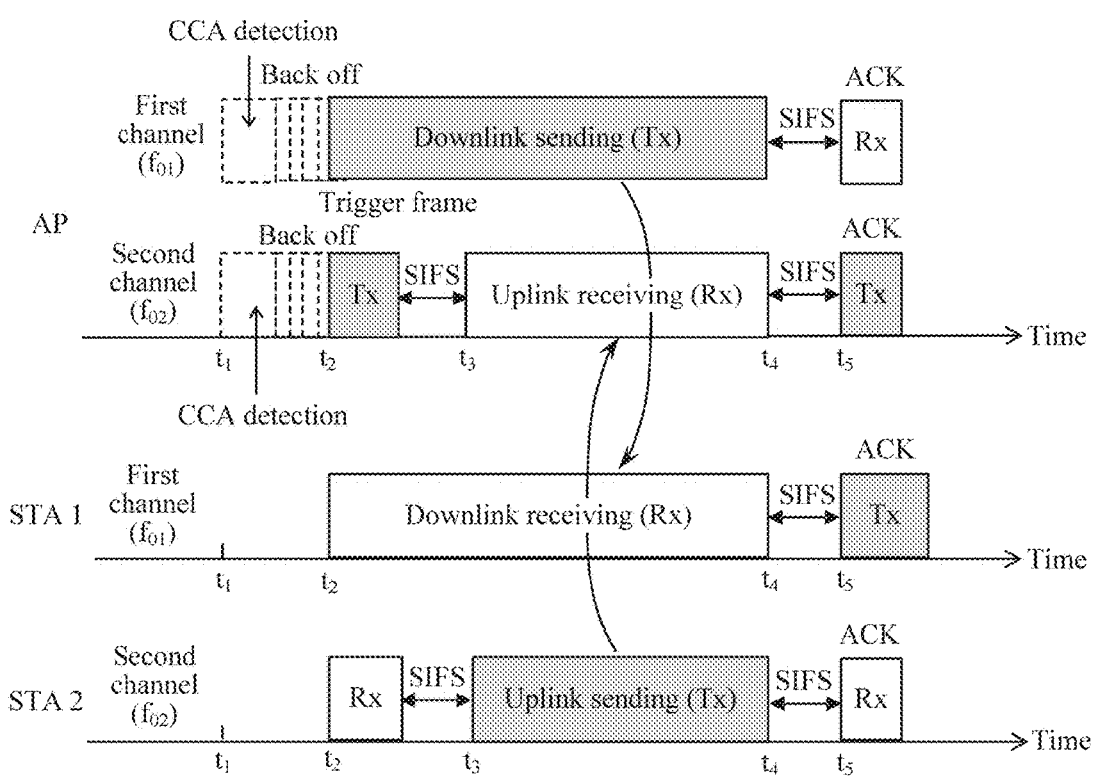
FIG. 9 is a schematic diagram of an uplink and downlink WLAN data transmission process according to Embodiment 4 of the present disclosure.

For the foregoing case, in the use environment, a process of transmitting a data packet by using the method provided in this embodiment of the present disclosure is shown in FIG. 9, including sending, by the AP, downlink data to a STA 1 by using the first channel whose carrier frequency is f01, and simultaneously receiving, by using the second channel whose carrier frequency is f02, uplink data sent by a STA 2.

At a moment t1, the AP performs CCA detection on the first channel by using at least one but no more than n−1 receive paths, and performs CCA detection on the second channel by using remaining at least one receive path. If both the first channel and the second channel are idle, the AP starts a backoff mechanism on both the first channel and the second channel, and backoff on the two channels lasts a same time. After the backoff ends, the AP starts downlink transmission on the first channel at a moment t2 by using m−1 transmit paths, and simultaneously sends a trigger frame on the second channel by using remaining one transmit path, to send uplink transmission scheduling control information.

The scheduling control information includes, but is not limited to, information such as maximum transmission duration on the second channel, identifiers of various STAs that perform uplink data transmission after the trigger frame, transmission resources (for example, subcarrier resources of a frequency domain) used when the various STAs perform data transmission, a quantity of spatial flows and identifiers of corresponding spatial flows, and a MCS used to transmit a corresponding spatial flow. The scheduling control information may be at a physical layer of the trigger frame, such as a high efficiency signal-B field (HE-SIG-B), or the MAC may be transmitted in a data field of the trigger frame, that is, transmission is performed by using a MAC data unit in the data field of the trigger frame. A maximum transmission t duration $t_{DL, \, max}$, indicated by the trigger frame, on the second channel is: $t_{DL, \, max} = t_{UL} - t_{trigger} - t_{SIFS}$ (where $t_{trigger}$ is duration needed by the trigger frame, and $t_{SIFS}$ is SIFS interval duration).

After an SIFS time, the STA 2 sends, at a moment t3 according to the uplink transmission scheduling control information sent by the trigger frame on the second channel, an uplink data frame to the AP on the second channel. The AP may receive the uplink data frame on the second channel by using all receive paths (n receive paths).

End times of data frame transmission on the foregoing two channels are aligned, that is, transmission on the two channels ends at a moment t4. For a data frame, the AP may select a proper STA and a proper data volume for transmission by scheduling uplink transmission and downlink transmission of multiple STAs, thereby ensuring that an end time of an uplink data frame and an end time of a downlink data frame are the same or close. In addition, padding may be performed at a MAC layer or a physical layer to ensure that lengths of the uplink data frame and the downlink data frame are the same. A padding method at the MAC layer or the physical layer may be implemented by using a method in an existing WLAN technology, and details are not described herein.

After transmission of an uplink data frame and a downlink data frame is finished and an SIFS time elapses, if the STA 1 correctly receives the downlink data frame sent by the AP, the STA 1 sends an uplink ACK/BA frame to the AP at a moment t5. Moreover, if the AP correctly receives the uplink data frame sent by the STA 2, the AP also sends a downlink ACK/BA frame to the STA 2 at the moment t5. In a transmission phase of an ACK/BA frame, the AP may send the downlink ACK/BA frame on the second channel by using all the m transmit paths, or may receive the uplink ACK/BA frame on the first channel by using all the n receive paths. Lengths of the uplink ACK/BA frame and the downlink ACK/BA frame may be different.

In addition to the transmission procedure shown in Embodiment 4, uplink and downlink of multiple STAs may be supported on both the first channel and the second channel. Specific information related to the multiple STAs may appear in the trigger frame of the second channel and downlink transmission of the first channel.

In this embodiment, the AP has m transmit paths and n receive paths, where m is a maximum quantity of transmit paths of the AP and n is a maximum quantity of receive paths of the AP.

The AP supports sending downlink transmission on the first channel by using m−1 transmit paths, and simultaneously supports receiving uplink transmission on the second channel by using the n receive paths, where a sum of a quantity of transmit paths and a quantity of receive paths that are simultaneously used on the first channel and the second channel is greater than a larger value between m and n.

Embodiment 5

Figure 10:
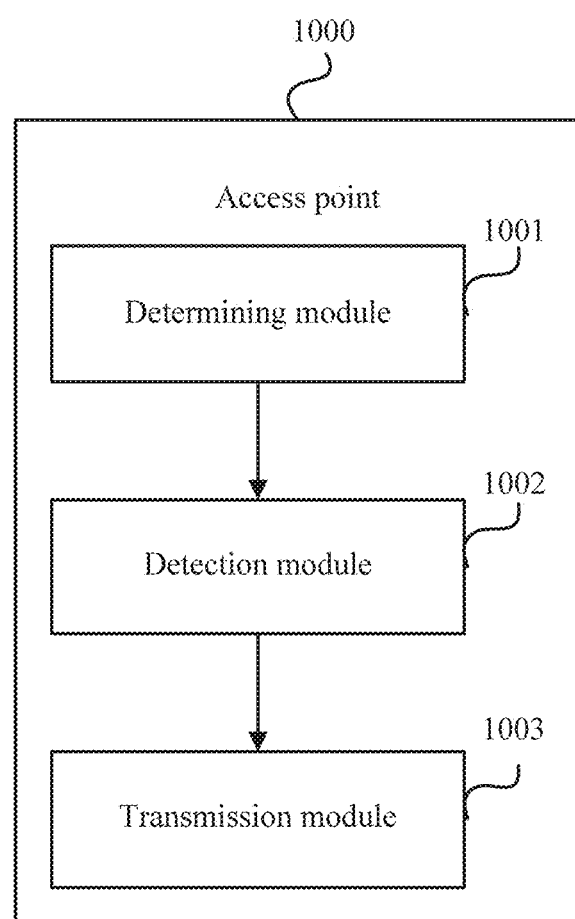
FIG. 10 is a simple schematic diagram of an AP according to an embodiment of the present disclosure.

As shown in FIG. 10, this embodiment of the present disclosure further provides an AP. The AP 1000 specifically includes a determining module 1001, configured to: when it is detected that a first channel is occupied by carrier sense multiple access CSMA contention, determine first transmission duration of a first channel data packet transmitted on the first channel; a detection module 1002, configured to determine, by means of clear channel assessment CCA detection, that a second channel is idle, where the second channel is used to transmit a second channel data packet, and a transmission direction of the second channel data packet and a transmission direction of the first channel data packet are opposite; and a transmission module 1003, configured to: determine, by using the first transmission duration, second transmission duration corresponding to the second channel data packet, and transmit the second channel data packet on the second channel according to the second transmission duration, where an end time of transmission of second channel data is not later than an end time of transmission of the first channel data.

In this embodiment of the present disclosure, data transmission that occupies the first channel includes uplink transmission and downlink transmission, and for different transmission directions, the AP needs to determine duration of opposite-direction transmission in a different manner. That the first channel is uplink transmission and that the first channel is downlink transmission are separately described below.

1. When the first channel is used to transmit uplink data, the determining module 1001 is specifically configured to detect whether there is transmission information including transmission duration of a data packet before the first channel data packet is transmitted, and if yes, obtain the first transmission duration of the first channel data packet from the transmission information; or if not, parse preamble information of the first channel data packet, and obtain the first transmission duration of the first channel data packet from the preamble information.

The transmission information includes an RTS frame, an RR message, or a PS-Poll frame, and the determining module 1001 is specifically configured to obtain the first transmission duration from the RTS frame, the RR message, or the PS-Poll frame.

In this embodiment, the determining module 1001 may obtain the first transmission duration according to preamble information of a transmitted message or transmitted data. It takes different periods of time to obtain the first transmission duration because the first transmission duration is obtained in different manners. Therefore, corresponding duration that can be used for transmission of the second channel data is also different. Specifically, implementation of determining the second transmission duration may be:

The transmission module 1003 is specifically configured to: if the first transmission duration is not obtained before the first channel initiates uplink transmission, determine that the second transmission duration is remaining duration after duration occupied by parsing the preamble information is subtracted from the first transmission duration; or that the second transmission duration is remaining duration after duration occupied by parsing the preamble information and duration occupied by the CCA detection are subtracted from the first transmission duration; or in addition, if the first transmission duration is obtained before the first channel initiates uplink transmission, determine that the second transmission duration is the same as the first transmission duration; or that the second transmission duration is remaining duration after duration occupied by the CCA detection is subtracted from the first transmission duration.

Further, when different data is transmitted between an AP and a STA, different transmission manners need to be used based on some characteristics of data. In this embodiment, if another step needs to be performed on the data transmitted between the AP and the STA in addition to the parsing of the preamble information and the CCA detection, a time spent on the another step also needs to be subtracted when the second transmission duration is calculated. There are multiple kinds of data transmission, and details are not described herein. To describe this case, transmission of CSMA data is used as an example. That is, when the second channel data packet is a CSMA data packet, the AP further includes a backoff module configured to initiate a backoff operation before the second channel data packet is transmitted on the second channel according to the second transmission duration, and transmit the second channel data packet on the second channel according to the second transmission duration when the backoff operation is finished. Correspondingly, the transmission module 1003 is further configured to use duration, which remains after duration occupied by the backoff operation is subtracted from the second transmission duration, as transmission duration of the second channel data packet.

In a WLAN system, the AP has m transmit paths and n receive paths, where m is a maximum quantity of transmit paths of the AP, and n is a maximum quantity of receive paths of the AP; and the method includes supporting, by the AP, receiving uplink transmission on the first channel by using receive paths, and simultaneously supporting sending downlink transmission on the second channel by using the m transmit paths, where a sum of a quantity of transmit paths and a quantity of receive paths that are simultaneously used on the first channel and the second channel is greater than a larger value between m and n.

2. If the first channel is used to transmit downlink data, the AP may directly determine the first transmission duration. Therefore, when the first channel is used to transmit downlink data, and the AP schedules the second channel for uplink transmission the transmission module 1003 is configured to determine that the second transmission duration is remaining duration after duration occupied by the AP to schedule the second channel and duration occupied by an inter-frame interval are subtracted from the first transmission duration.

In a WLAN system, the AP has m transmit paths and n receive paths, where m is a maximum quantity of transmit paths of the AP, and n is a maximum quantity of receive paths of the AP; and the method includes supporting, by the AP, sending downlink transmission on the first channel by using m−1 transmit paths, and simultaneously supporting receiving uplink transmission on the second channel by using the n receive paths, where a sum of a quantity of transmit paths and a quantity of receive paths that are simultaneously used on the first channel and the second channel is greater than a larger value between m and n.

Embodiment 6

Figure 11:
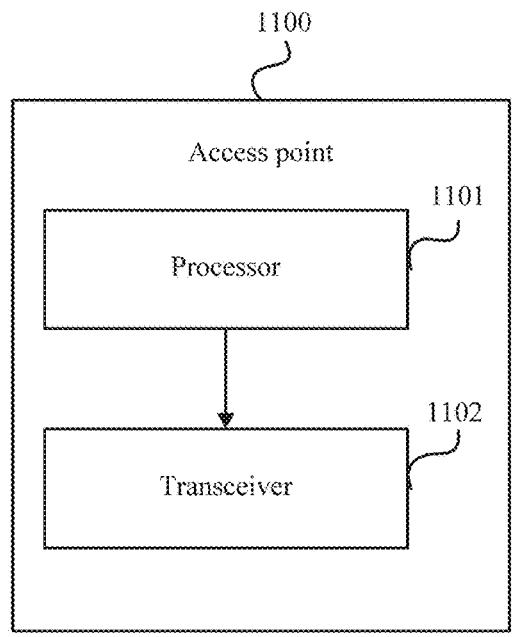
FIG. 11 is a simple schematic diagram of another AP according to an embodiment of the present disclosure.

As shown in FIG. 11, this embodiment of the present disclosure further provides another AP. The AP 1100 specifically includes a processor 1101, configured to: when it is detected that a first channel is occupied by carrier sense multiple access CSMA contention, determine first transmission duration of a first channel data packet transmitted on the first channel; determine, by means of clear channel assessment CCA detection, that a second channel is idle, where the second channel is used to transmit a second channel data packet, and a transmission direction of the second channel data packet and a transmission direction of the first channel data packet are opposite; and determine, by using the first transmission duration, second transmission duration corresponding to the second channel data packet; and a transceiver 11002, configured to transmit the second channel data packet on the second channel according to the second transmission duration, where an end time of transmission of second channel data is not later than an end time of transmission of the first channel data.

In this embodiment of the present disclosure, data transmission that occupies the first channel includes uplink transmission and downlink transmission, and for different transmission directions, the AP needs to determine duration of opposite-direction transmission in a different manner. That the first channel is uplink transmission and that the first channel is downlink transmission are separately described below.

1. When the first channel is used to transmit uplink data, the AP is a party receiving data. Therefore, transmission duration for transmitting data on the first channel needs to be obtained in a particular manner. Implementation may be as follows.

When the first channel is used to transmit uplink data, the processor 1101 detects whether there is transmission information including transmission duration of a data packet before the first channel data packet is transmitted, and if yes, obtains the first transmission duration of the first channel data packet from the transmission information; or if not, parses preamble information of the first channel data packet, and obtains the first transmission duration of the first channel data packet from the preamble information.

The transmission information includes an RTS frame, an RR message, or a PS-Poll frame.

A manner for obtaining the first transmission duration may be obtaining the first transmission duration according to preamble information of a transmitted message or transmitted data. It takes different periods of time to obtain the first transmission duration because the first transmission duration is obtained in different manners. Therefore, corresponding duration that can be used for transmission of the second channel data is also different. Implementation of determining the second transmission duration may be:

If the first transmission duration is not obtained before the first channel initiates uplink transmission, the processor 1101 is configured to determine that the second transmission duration is remaining duration after duration occupied by parsing the preamble information is subtracted from the first transmission duration; or that the second transmission duration is remaining duration after duration occupied by parsing the preamble information and duration occupied by the CCA detection are subtracted from the first transmission duration; or in addition, if the first transmission duration is obtained before the first channel initiates uplink transmission, the processor 1101 is configured to determine that the second transmission duration is the same as the first transmission duration; or that the second transmission duration is remaining duration after duration occupied by the CCA detection is subtracted from the first transmission duration.

Further, if the second channel data packet is a CSMA data packet, the processor 1101 is further configured to: initiate a backoff operation before the second channel data packet is transmitted on the second channel according to the second transmission duration, and the second channel data packet is transmitted on the second channel according to the second transmission duration when the backoff operation is finished.

Correspondingly, remaining duration after duration occupied by the backoff operation is subtracted from the second transmission duration is used as transmission duration of the second channel data packet.

In a WLAN system, the AP has m transmit paths and n receive paths, where m is a maximum quantity of transmit paths of the AP, and n is a maximum quantity of receive paths of the AP; and the method includes supporting, by the AP, receiving uplink transmission on the first channel by using n−1 receive paths, and simultaneously supporting sending downlink transmission on the second channel by using the m transmit paths, where a sum of a quantity of transmit paths and a quantity of receive paths that are simultaneously used on the first channel and the second channel is greater than a larger value between m and n.

2. If the first channel is used to transmit downlink data, the AP may directly determine the first transmission duration. When the first channel is used to transmit downlink data, the AP schedules the second channel for uplink transmission, and the processor 1101 determines, by using the first transmission duration, the second transmission duration corresponding to the second channel data packet. Specific implementation may be determining that the second transmission duration is remaining duration after duration occupied by the AP to schedule the second channel and duration occupied by an inter-frame interval are subtracted from the first transmission duration.

In a WLAN system, the AP has m transmit paths and n receive paths, where m is a maximum quantity of transmit paths of the AP, and n is a maximum quantity of receive paths of the AP; and the method includes supporting, by the AP, sending downlink transmission on the first channel by using m−1 transmit paths, and simultaneously supporting receiving uplink transmission on the second channel by using the n receive paths, where a sum of a quantity of transmit paths and a quantity of receive paths that are simultaneously used on the first channel and the second channel is greater than a larger value between m and n.

The foregoing one or more technical solutions in the embodiments of this application have at least the following technical effects:

By means of the method for transmission and reception in parallel on dual channels, and the apparatus that are provided in the present disclosure, a system throughput may be effectively improved by fully using processing capabilities of existing transmit and receive paths without increasing complexity (including path bandwidths and a quantity of paths) of the transmit paths and the receive paths. Moreover, maximum transmission duration initiated at an AP end needs to be adjusted according to transmission duration of CSMA contention access of a STA, so as to avoid that dual channels are locked.

In an existing dual frequency WLAN transmission method, if a maximum quantity of transmit paths and a maximum quantity of receive paths of an AP are both p, the AP may use p1 transmit paths or receive paths at one frequency band, and use at most p−p1 transmit paths or receive paths at the other frequency band. In this way, a maximum total quantity of channels that can be simultaneously used is p. However, in the solution provided in this embodiment of the present disclosure, when a maximum quantity of transmit paths and a maximum quantity of receive paths of an AP is p, a maximum total quantity of channels that can be simultaneously used is 2p−1. P−1 transmit paths and p receive paths are simultaneously used, or p transmit paths and p−1 receive paths are simultaneously used.

Embodiment 7

Figure 12:
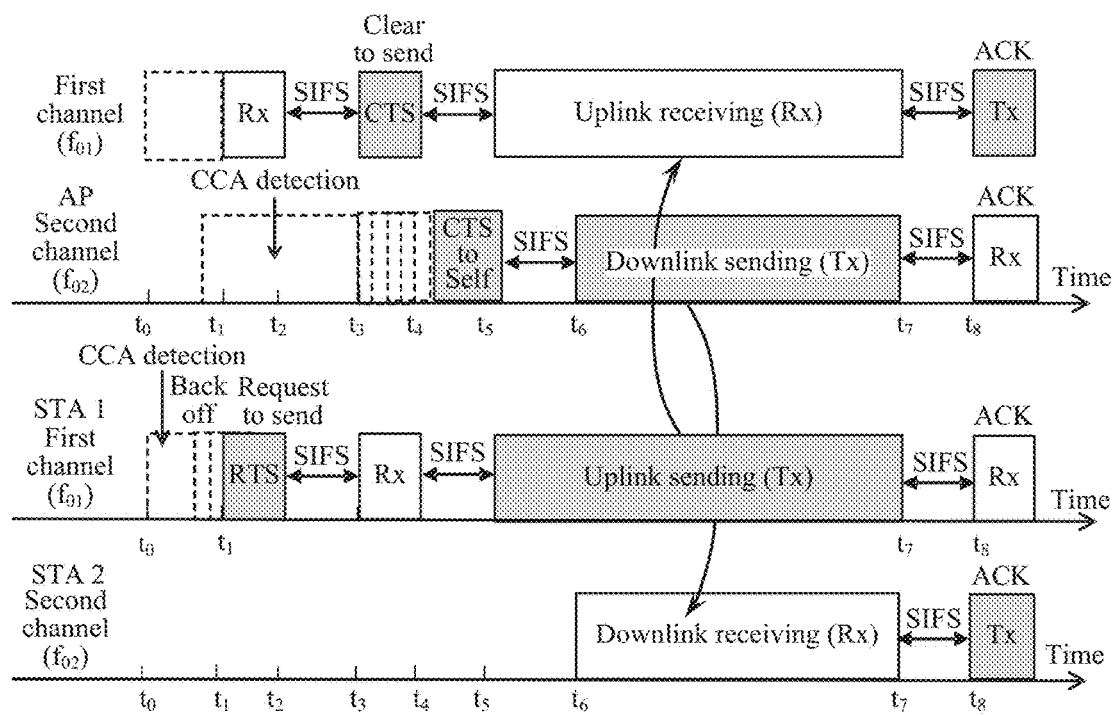
FIG. 12 is a schematic flowchart of another method according to an embodiment of the present disclosure.

As shown in FIG. 12, this embodiment of the present disclosure provides a method for transmission and reception in parallel on dual channels. The method specifically includes.

At a moment t1, a STA 1 having a transmission need sends an RTS frame to an AP, and finishes transmission at a moment t2. The AP performs CCA detection on a first channel by using at least one but no more than n−1 receive paths, and performs CCA detection on a second channel by using remaining at least one receive path. After the RTS frame is received at the AP end, it is identified whether the RTS frame is a transmission packet for the AP end; if yes, after SIFS duration, a CTS frame is sent to the STA 1 at a moment t3, and sending is finished at a moment t4. After receiving the CTS frame, and after an SIFS delay, the STA 1 initiates uplink transmission at a moment t5; and in this case, the AP receives uplink transmission of the STA on the first channel by using n−1 receive paths.

When the AP sends the CTS frame at the moment t3, if it is detected, by means of CCA detection, that the second channel is idle, the AP initiates backoff on the second channel. After the backoff is finished, the AP transmits the CTS frame by using no more than m−1 transmit paths. Address information of the AP is transmitted in a receive address (receive address) of the CTS frame. Optionally, information transmitted in a duration field of the CTS frame is 16, and an objective is to prevent a channel from being occupied till the end of an SIFS. A function of the CTS frame is that when a time for the backoff is not determined and total duration of downlink sending cannot be determined, after backoff on the second channel is finished, the CTS is used to occupy a channel.

CCA detection is performed on remaining one receive path on the second channel. Because the AP knows an uplink initiation time and the uplink transmission duration of the STA 1, the AP may perform downlink transmission (for example, send downlink data to a STA 2) on the second channel by using all the m transmit paths. A maximum value $t_{DL,\ max}$ of the downlink transmission duration is: $t_{DL,\ max}=t_{UL}-t_{backoff}$ is backoff duration of the AP on the second channel. After a period of time of sending, receiving of the uplink data and transmission of the downlink data at the AP end are finished at t7.

After transmission of an uplink data frame and transmission of a downlink data frame are finished and an SIFS time elapses, if the AP correctly receives the uplink data frame sent by the STA 1, the AP sends a downlink ACK/BA frame to the STA 1 at a moment t8. Moreover, if the STA 2 correctly receives the downlink data frame sent by the AP, the STA 2 also sends an uplink ACK/BA frame to the AP at a moment t8. In a transmission phase of an ACK/BA frame, the AP may send the downlink ACK/BA frame on the first channel by using all the m transmit paths, or may receive the uplink ACK/BA frame on the second channel by using all the n receive paths. Lengths of the uplink ACK/BA frame and the downlink ACK/BA frame may be different.

A biggest difference between this embodiment and the foregoing embodiments is that in this embodiment, the AP does not know for sure how long it takes to back off on an access channel when the AP receives an RTS on the first channel and detects that the second channel is idle. Therefore, when backoff is finished, the AP first sends the CTS frame to occupy the channel. Because the AP already backs off when sending the CTS frame, the AP determines a time length of downlink sending according to remaining duration, to generate a downlink frame.

The method of the present disclosure is not limited to the embodiments described in the specific implementation manners. Other implementation manners obtained by a person skilled in the art according to the technical solutions of the present disclosure also fall within the technical innovation scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for transmission and reception in parallel on dual channels, wherein the method comprises:
   determining, by an access point (AP), a first transmission duration of a first channel data packet transmitted on a first channel when detecting that the first channel is occupied by carrier sense multiple access (CSMA) contention, wherein when the first channel is used to transmit uplink data, determining the first transmission duration of the first channel data packet transmitted on the first channel comprises obtaining the first transmission duration of the first channel data packet from transmission information when the access point detects that there is transmission information comprising transmission duration before the first channel data packet is transmitted, and wherein determining the transmission duration comprises parsing preamble information of a first channel data packet to obtain the first transmission duration of the first channel data packet from the preamble information when the access point detects that there is no transmission information comprising transmission duration of a data packet before the first channel data packet is transmitted;

determining, by a clear channel assessment (CCA) detector, that a second channel is idle, wherein the second channel is used to transmit a second channel data packet, and wherein a transmission direction of the second channel data packet is opposite a transmission direction of the first channel data packet;

determining, using the first transmission duration, a second transmission duration corresponding to the second channel data packet; and transmitting the second channel data packet on the second channel according to the second transmission duration, wherein an end time of transmission of the second channel data packet is not later than an end time of transmission of the first channel data packet.

2. The method of claim 1, wherein determining, using the first transmission duration, the second transmission duration corresponding to the second channel data packet comprises determining that the second transmission duration is a first remaining duration after a duration occupied by parsing the preamble information is subtracted from the first transmission duration when the AP does not obtain the first transmission duration before the first channel initiates uplink transmission.

3. The method of claim 1, wherein determining, using the first transmission duration, the second transmission duration corresponding to the second channel data packet comprises determining that the second transmission duration is a second remaining duration after the duration occupied by parsing the preamble information and a duration occupied by CCA detection are subtracted from the first transmission duration when the AP does not obtain the first transmission duration before the first channel initiates uplink transmission.

4. The method of claim 1, wherein determining, using the first transmission duration, the second transmission duration corresponding to the second channel data packet comprises determining that the second transmission duration is the same as the first transmission duration when the AP obtains the first transmission duration before the first channel initiates uplink transmission.

5. The method of claim 1, wherein determining, using the first transmission duration, the second transmission duration corresponding to the second channel data packet comprises determining that the second transmission duration is a third remaining duration after the duration occupied by the CCA detection is subtracted from the first transmission duration when the AP obtains the first transmission duration before the first channel initiates uplink transmission.

6. The method of claim 2, wherein when the second channel data packet is a CSMA data packet, before transmitting the second channel data packet on the second channel according to the second transmission duration, the method further comprises:

initiating a backoff operation; and transmitting the second channel data packet on the second channel according to the second transmission duration when the backoff operation is finished, and wherein a duration of transmission of the second channel data packet is a fourth remaining duration after duration occupied by the backoff operation is subtracted from the second transmission duration.

7. The method of claim 1, wherein in a WLAN system, the AP has m transmit paths and n receive paths, wherein m is a maximum quantity of transmit paths of the AP, wherein n is a maximum quantity of receive paths of the AP, wherein the method comprises:

receiving, by the AP, an uplink transmission packet on the first channel using n−1 receive paths; and sending a downlink transmission packet on the second channel using the m transmit paths, and wherein a sum of a quantity of transmit paths and a quantity of receive paths that are simultaneously used on the first channel and the second channel is greater than a value m and a value of n.

8. The method of claim 1, wherein when the first channel is used to transmit downlink data, and when the AP schedules the second channel for uplink transmission, determining, using the first transmission duration, the second transmission duration of the second channel data packet comprises determining that the second transmission duration is a remaining duration after a duration occupied by the AP to schedule the second channel and a duration occupied by an inter-frame interval are subtracted from the first transmission duration.

9. The method of claim 8, wherein in a WLAN system, the AP has m transmit paths and n receive paths, wherein in is a maximum quantity of transmit paths of the AP, wherein n is a maximum quantity of receive paths of the AP, wherein the method comprises:

sending, by the AP, a downlink transmission packet on the first channel using m−1 transmit paths; and simultaneously receiving an uplink transmission packet on the second channel using the n receive paths, and wherein a sum of a quantity of transmit paths and a quantity of receive paths that are simultaneously used on the first channel and the second channel is greater than a value of m and a value of n.

10. An access point, comprising:

a processor configured to:

determine a first transmission duration of a first channel data packet transmitted on a first channel when it is detected that the first channel is occupied by carrier sense multiple access (CSMA) contention;

perform clear channel assessment (CCA) detection to determine that a second channel is idle, wherein the second channel is used to transmit a second channel data packet, and wherein a transmission direction of the second channel data packet is opposite a transmission direction of the first channel data packet; and determine, using the first transmission duration, a second transmission duration corresponding to the second channel data packet, wherein when the first channel is used to transmit downlink data and when the access, point schedules the second channel for plink transmission, the processor is configured to determine that the second transmission duration is a remaining duration after a duration occupied by the access point to schedule the second channel and a duration occupied by an inter-frame interval are subtracted from the first transmission duration; and a transceiver coupled to the processor and configured to transmit the second channel data packet on the second channel according to the second transmission duration, wherein an end time of transmission of the second channel data packet is not later than an end time of transmission of the first channel data packet.

11. The access point of claim 10, wherein when the first channel is used to transmit uplink data, the processor is configured to obtain the first transmission duration of the first channel data packet from transmission information when the processor detects that there is transmission information comprising transmission duration before the first channel data packet is transmitted.

12. The access point of claim 11, wherein the processor is configured to parse preamble information of the first channel data packet to obtain the first transmission duration of the first channel data packet from the preamble information when the processor detects that there is no transmission information comprising transmission duration of a data packet before the first channel data packet is transmitted.

13. The access point of claim 12, wherein the processor is configured to determine that the second transmission duration is a first remaining duration after duration occupied by parsing the preamble information is subtracted from the first transmission duration when the first transmission duration is not obtained before the first channel initiates uplink transmission.

14. The access point of claim 12, wherein the processor is configured to determine that the second transmission duration is a second remaining duration after duration occupied by parsing the preamble information and duration occupied by the CCA detection are subtracted from the first transmission duration when the first transmission duration is not obtained before the first channel initiates uplink transmission.

15. The access point of claim 12, wherein the processor is configured to determine that the second transmission duration is the same as the first transmission duration when the first transmission duration is obtained before the first channel initiates uplink transmission.

16. The access point of claim 12, wherein the processor is configured to determine that the second transmission duration is a third remaining duration after duration occupied by the CCA detection is subtracted from the first transmission duration when the first transmission duration is obtained before the first channel initiates uplink transmission.

17. The access point of claim 13, wherein when the second channel data packet is a CSMA data packet, the processor is further configured to:

initiate a backoff operation before the second channel data packet is transmitted on the second channel according to the second transmission duration; and transmit the second channel data packet on the second channel according to the second transmission duration when the backoff operation is finished, and wherein a duration of transmission of the second channel data packet is a fourth duration that remains after duration occupied by the backoff operation is subtracted from the second transmission duration.

18. A method for transmission and reception in parallel on dual channels, the method comprising:

determining, by an access point (AP), a first transmission duration of a first channel data packet transmitted on a first channel when detecting that the first channel is occupied by carrier sense multiple access (CSMA) contention;

determining, by a clear channel assessment (CCA) detector, that a second channel is idle, wherein the second channel is used to transmit a second channel data packet, and wherein a transmission direction of the second channel data packet is opposite a transmission direction of the first channel data packet;

determining, using the first transmission duration, a second transmission duration corresponding to the second channel data packet, wherein when the first channel is used to transmit downlink data, and when the AP schedules the second channel for uplink transmission, determining, using the first transmission duration, the second transmission duration of the second channel data packet comprises determining that the second transmission duration is a remaining duration after a duration occupied by the AP to schedule the second channel and a duration occupied by an inter-frame interval are subtracted from the first transmission duration; and transmitting the second channel data packet on the second channel according to the second transmission duration, wherein an end time of transmission of the second channel data packet is not later than an end time of transmission of the first channel data packet.

* * * * *